Oct. 27, 1931.     L. E. LA BRIE     1,828,972
VEHICLE WHEEL
Filed Feb. 27, 1925
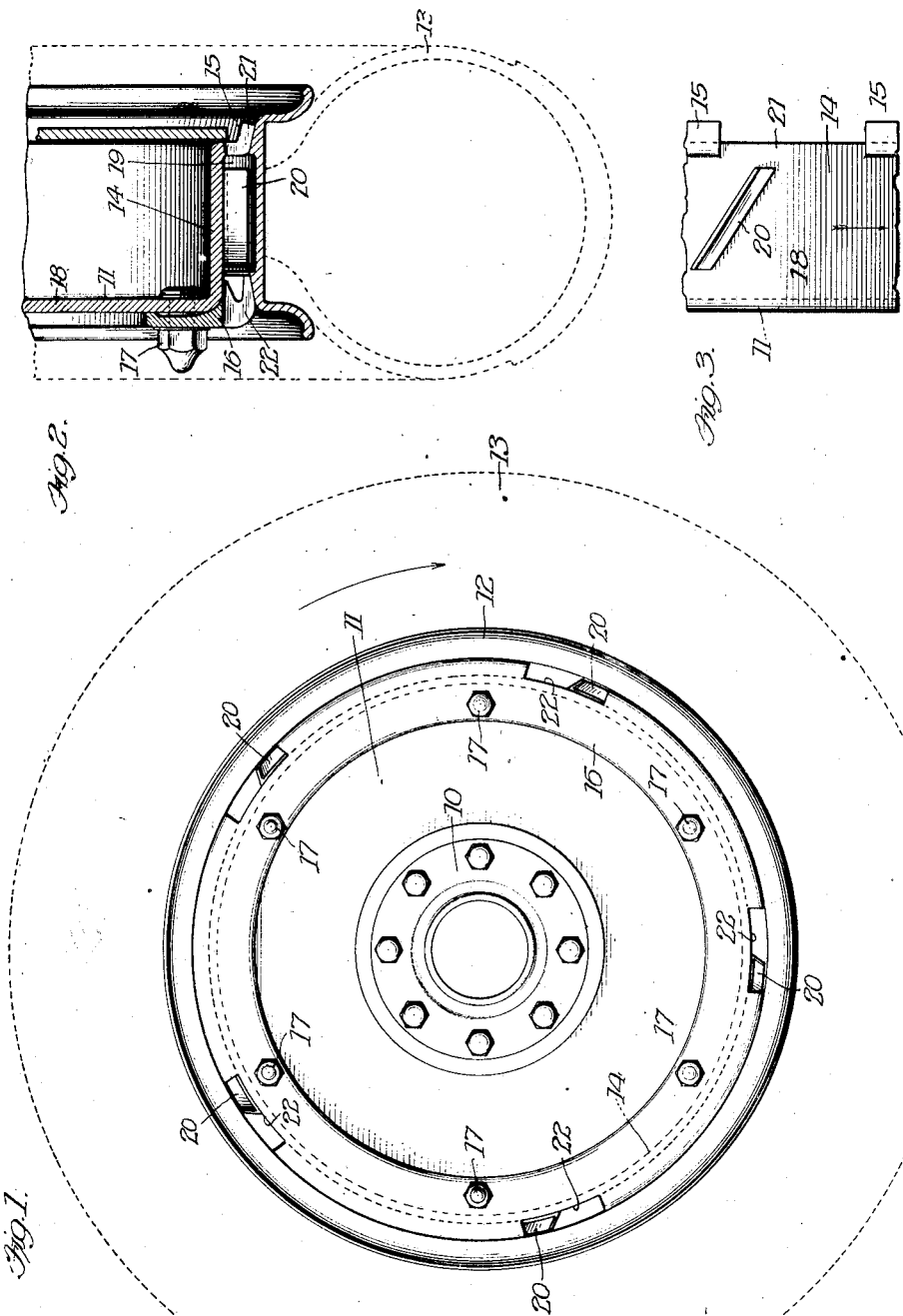

Patented Oct. 27, 1931

1,828,972

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

VEHICLE WHEEL

Application filed February 27, 1925. Serial No. 11,935.

This invention has to do with vehicle wheels, and is particularly concerned with a wheel structure wherein the tire rim is mounted directly upon the brake drum.

The main object of the invention is to provide means in a wheel structure of the type described for rapidly dissipating the heat from the enclosed brake drum.

While the foregoing statement is indicative of the nature of the invention, other objects and advantages will be evident upon a full understanding of the invention as embodied in the vehicle wheel presented in the accompanying drawings and in the following detailed description based thereon. One embodiment of the invention is set forth in the drawings and description, but it will be understood that the invention may be modified in many respects without departing from the spirit of the invention as defined by the appended claims.

In the drawings:

Fig. 1 is a side view of a wheel equipped with the invention;

Fig. 2 is a fragmentary section taken radially through the wheel, and

Fig. 3 is a fragmentary view of the outer face of the brake drum.

Referring in detail to the drawings, it will be observed that the wheel structure used to exemplify the invention comprises a hub 10, a brake drum 11 fastened to the hub, a rim 12 secured to the drum, and a tire 13 mounted upon the rim. The brake drum is characterized by the usual rearwardly extending flange 14 against which the brake shoes are adapted to bear, and the flange 14 is encompassed by the rim 12. The rim 12 is supported, at its rear, by an inclined flange 15 which is formed on the rear part of the flange 14 of the drum, and at its front, by a wedge ring 16 which is adjustably attached by bolts 17 to the web 18 of the drum. The above described arrangement of the drum and rim leaves but a small annular space 19 between the same, and consequently necessitates the provision of means which will act to dissipate the heat generated in the drum upon the application of the brake shoes.

The invention resides in the provision of a plurality of ventilating fins 20 which are secured to and extend diagonally across the outer face of the flange 14 of the drum in the annular space 19. The fins 20 are intended to induce currents of air to flow across the outer face of the flange 14 when the wheel is rotated, and, to facilitate such action, the flange 15 and the ring 16 are cut away at 21 and 22 respectively opposite the ends of the fins 20. The fins 20 may have any suitable formation, but are shown in the present disclosure as being of L-shaped cross-section and having one of their resulting flanges permanently secured, as by welding, to the face of the drum. If a plurality of wedge clips are used in the place of the single wedge ring 16, the clips may be so arranged that the spaces therebetween will serve the purpose of the cut-away portions 22 of the ring.

I claim:

1. In a vehicle wheel, a brake drum, a tire rim supported by the drum in radially separated relation thereto, and means interposed in the space between the drum and the rim for inducing currents of air to flow across the outer face of the drum between the drum and rim when the wheel is rotated.

2. In a vehicle wheel, a brake drum, a tire rim encompassing the drum in radially separated relation thereto, a flange on the drum for supporting the rear portion of the rim, a detachable ring on the drum for supporting the front portion of the rim, means interposed in the space between the drum and the rim for inducing currents of air to flow across the outer face of the drum when the wheel is rotated, said flange and ring having openings therein adjacent the first mentioned means for permitting the flow of air.

3. In a vehicle wheel, a brake drum, a tire rim encompassing the drum in radially separated relation thereto, means for supporting the rim on the drum in such position, and a plurality of ventilating fins secured to and extending diagonally across the outer face of the drum in the space between the drum and the rim for inducing currents of air to flow across the outer face of the drum between the rim and drum when the wheel is rotated.

4. In a vehicle wheel, a brake drum, a tire rim encompassing the drum in radially separated relation thereto, means for supporting the rim on the drum in such position, a plurality of ventilating fins secured to the outer face of the drum between the drum and the rim for inducing currents of air to flow across the outer face of the drum when the wheel is rotated, said wheel structure having openings therein adjacent the ends of the fins for permitting the flow of air.

5. A wheel comprising a brake drum formed with air-circulating means and with rim-engaging means, in combination with a rim mounted on the drum by said rim-engaging means and carrying a tire protected against braking heat by air circulated by the first of said means between said drum and rim.

In testimony whereof I have hereunto subscribed my name.

LUDGER E. LA BRIE.